Figure 1:
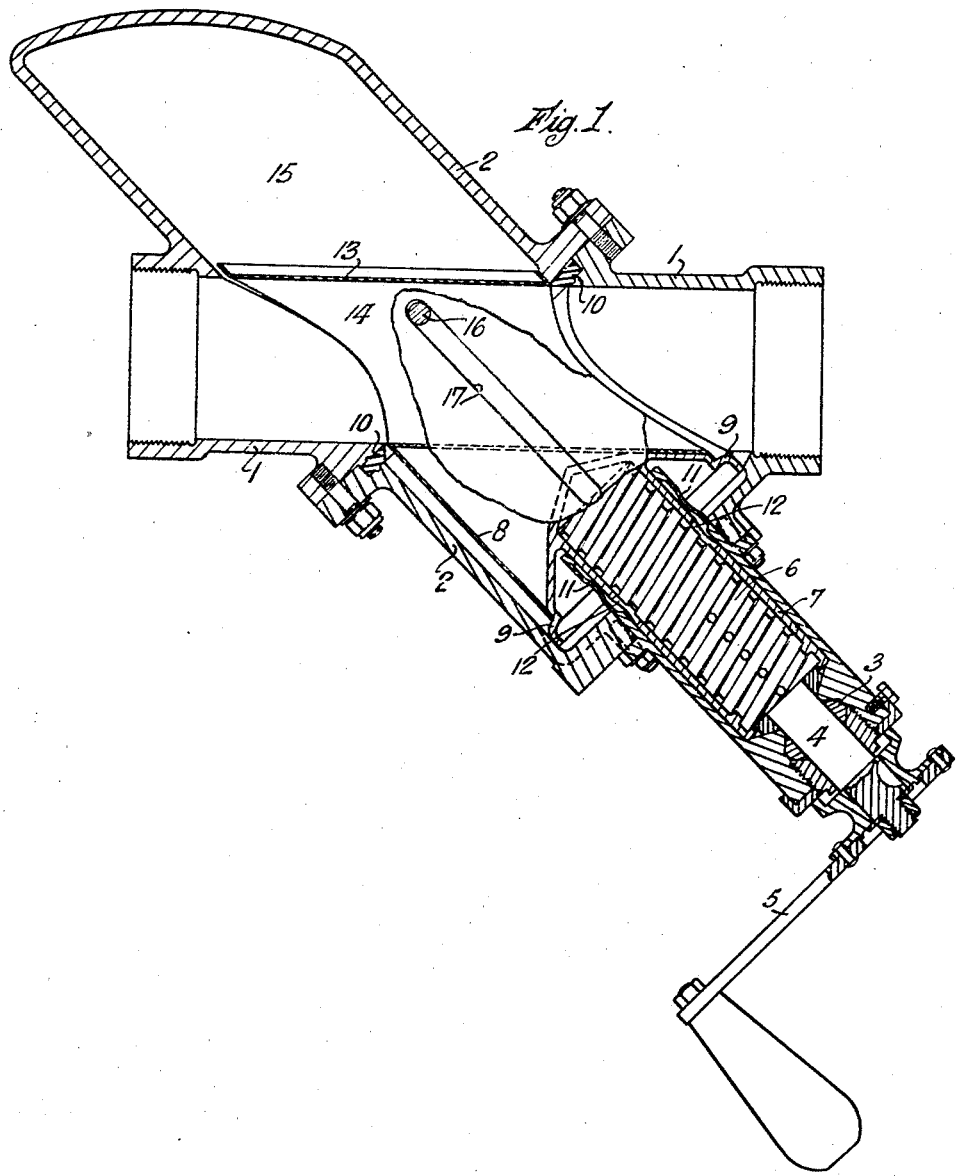

Nov. 23, 1943.　　　　　M. LANGLEY　　　　　2,335,067
VALVE DEVICE
Filed June 17, 1942　　　　3 Sheets-Sheet 1

Inventor
Marcus Langley
By his attorneys
Baldwin & Wight

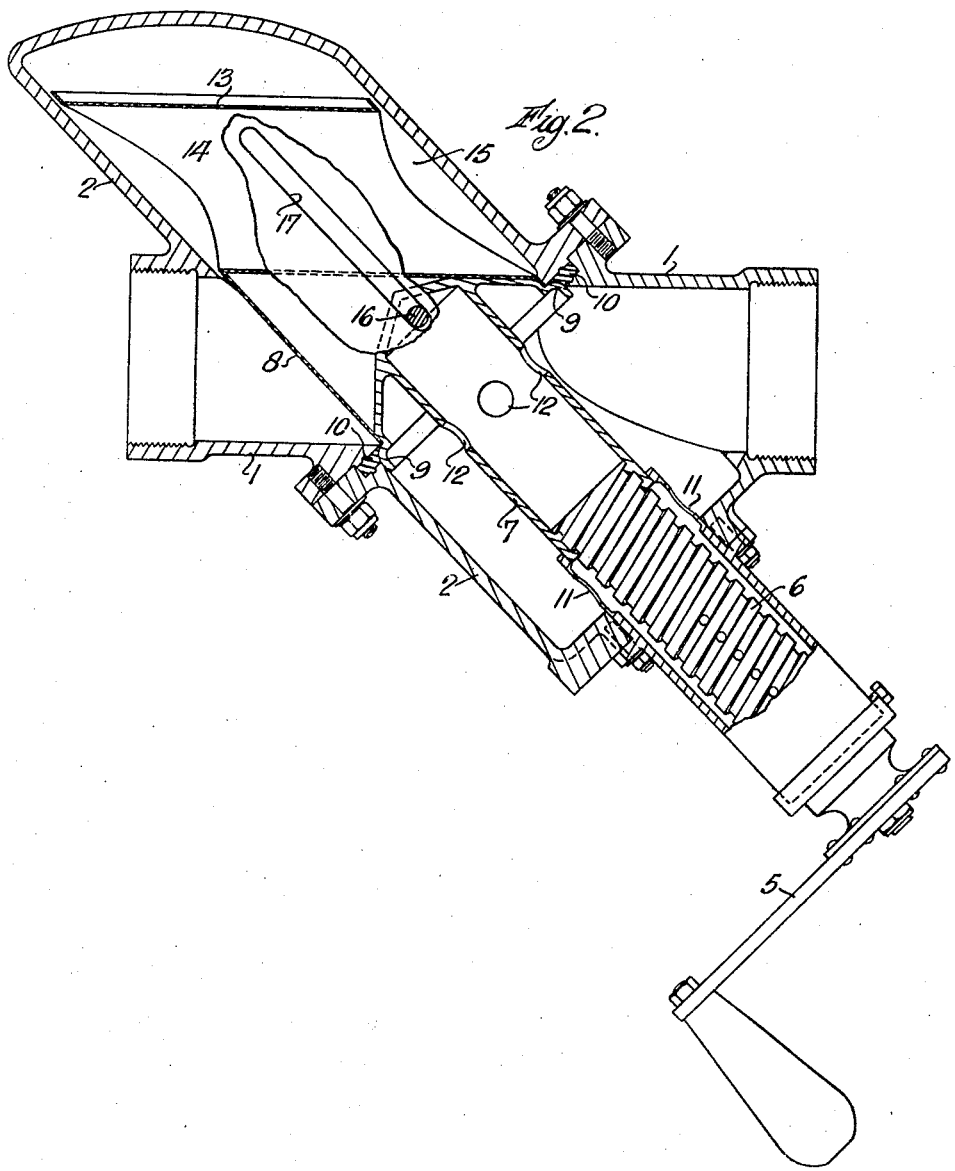

Nov. 23, 1943.         M. LANGLEY         2,335,067
                        VALVE DEVICE
                    Filed June 17, 1942        3 Sheets-Sheet 3
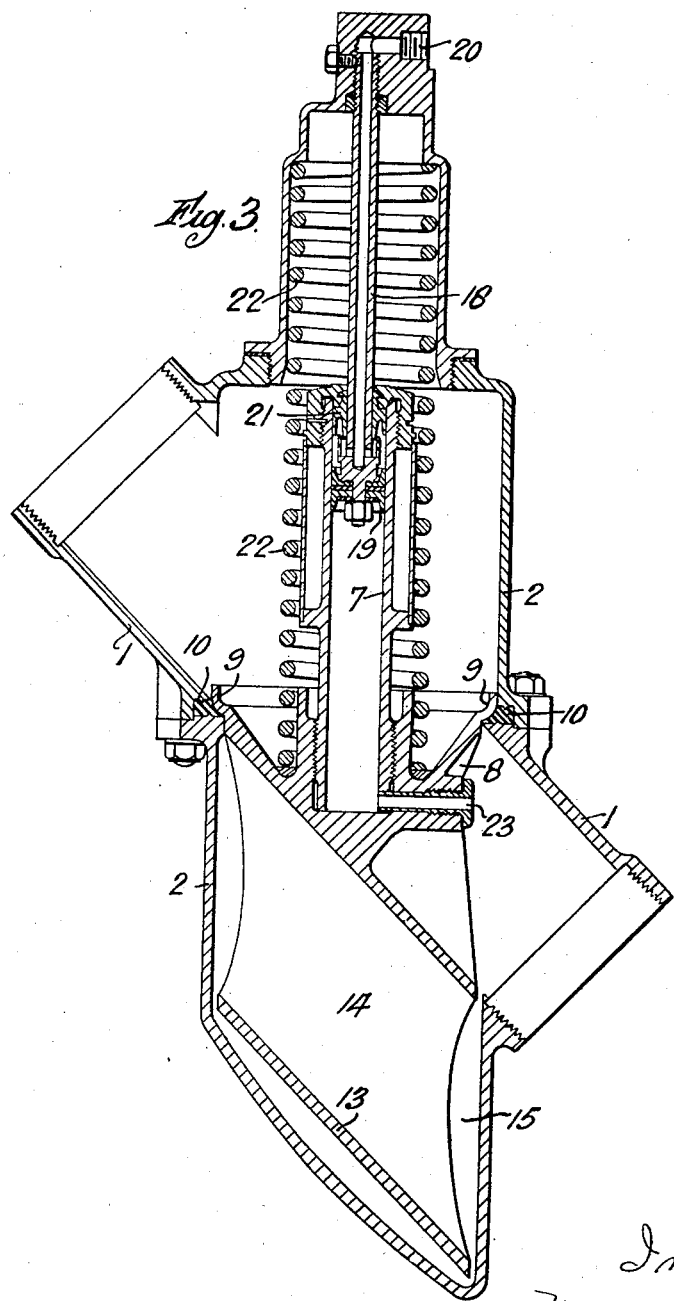

Patented Nov. 23, 1943

2,335,067

UNITED STATES PATENT OFFICE 2,335,067

VALVE DEVICE

Marcus Langley, Malvern, England, assignor to Flight Refuelling Limited, Temple, London, England Application June 17, 1942, Serial No. 447,400
In Great Britain September 30, 1940

1 Claim. (Cl. 137—139)

This invention relates to valve devices for controlling the flow of fluid through conduits.

In valve devices according to the invention, the valve is adapted to close on to or open away from a seating set obliquely across the conduit, and it is formed with or carries a skirt provided with a passage of which the cross-sectional diameter is substantially equal to that of the conduit, the arrangement being such that when the valve is in the fully open position, the passage in the skirt forms, so to speak, a continuation of the conduit thereby ensuring an even flow therethrough.

The valve may be moved axially by a simple pull and push movement produced manually, hydraulically or by forming the valve stem as a nut longitudinally movable over a screwed rod. Spring means may be employed to operate the valve in one direction and hydraulic means, for example, for operating it in the other direction. The valve member is preferably guided in its movements partly by a gland bearing for the valve stem or a co-operating member and partly by a pin and slot means. The invention is illustrated by way of example in the accompanying drawings, in which—

Figure 1 shows in sectional elevation a screw-operated valve in the open position, Figure 2 shows the same in the closed position, Figure 3 shows in sectional elevation, in the closed position, a modified form of valve in which actuation is performed by a spring in one direction and by hydraulic means in the other direction.

Referring to Figures 1 and 2, there is combined with the conduit 1 a valve chamber 2 extending at 45° to the axis of the conduit and on both sides thereof. Passing axially through a gland 3 at one end of the chamber is an operating rod 4, provided outside the chamber with a handle 5, and which, within the chamber, has a screwed portion 6 co-operating with a threaded hollow valve stem 7. The valve 8 on the stem is substantially conical in shape, the axis of the cone coinciding with that of the chamber, and is adapted to engage adjacent its outer edge 9 with a ring-shaped seating 10 of a relatively soft material, e. g., synthetic rubber or soft metal, so arranged that it does not interrupt the smooth channel of the conduit.

So that liquid shall not be trapped in that part of the valve casing in which the operating rod is housed, when the valve is brought to the raised position, leakage holes 11 are provided as shown, and further the valve stem is also provided with leakage holes 12.

A skirt 13 of cylindrical shape extends beyond the valve and is formed or provided with a duct or passage 14 of substantially the same interior shape as that of the conduit and in parallel relationship with the latter. When the valve is on its seating as shown in Figure 2 the skirt extends into the part 15 of the chamber 2, of the nature of a pocket outside the conduit.

As a guide for the skirt 13, there is provided within the conduit a pin 16 which co-operates with a slot 17 in the skirt.

In the modified form of valve shown in Figure 3, in which the same reference numerals indicate parts which are the same as or correspond with those in Figures 1 and 2, the valve stem 7 is slidable on a fixed piston rod 18 and on the plunger 19 secured to the rod. The opening 20 admits hydraulic fluid under pressure which passes through the hollow piston rod 18 at the bottom of which the fluid emerges into a space between the plunger 19 and the gland housing 21 of the valve stem 7. The compression spring 22 normally urges the valve into the closed position but when hydraulic fluid is admitted as aforesaid the valve is lifted off its seating against the spring and into the open position, in which as shown in Figure 2, the skirt 13 lines up with the conduit 1.

A drain plug 23 is provided for releasing fluid trapped in the hollow valve stem. The valve device, particularly in the form shown in Figure 3, is suitable for use in liquid fuel conduits in aircraft, especially when there are a plurality of valves in the fuel system, because it is then possible to provide a remote control for all these valves from a switchboard working either on the main hydraulic system or on a single hand-operated pump. The valve is however suitable for application to many other uses in various equipment and plant.

It is well known that plug valves, often employed for uses to which the valve devices of the invention are applicable, have to be carefully machined so that they fit their casing, and that the fit is usually so good that the plugs are moved with difficulty. The valves of the present invention need no such careful machining and are very easily moved within their chambers.

What I claim is:

A valve device for controlling flow through a conduit including a housing; a seat set obliquely across the conduit; a valve mounted for movement to close on and open away from said seat and having a seat-engaging portion disposed obliquely with respect to the conduit; a skirt carried by said valve and having a passage parallel to the conduit and a cross sectional area substantially the same as that of the conduit; operating means for moving the valve obliquely to the conduit selectively to move said seat-engaging portion away from said seat and place said skirt passage in registry with said conduit or to move said seating-engaging portion on said seat and place said skirt to project beyond said conduit, said operating means including a spring yieldably urging said valve on said seat, a cylinder fixed to said valve, a piston relatively reciprocable in said cylinder, and a piston rod fixed to said housing and providing a stationary mounting for said piston, said piston rod being hollow and thereby being adapted to provide communication of said cylinder with a source of fluid pressure for moving the cylinder and with it the valve in opposition to the urge of said spring.

MARCUS LANGLEY.